US011928316B2

(12) United States Patent
Dong

(10) Patent No.: US 11,928,316 B2
(45) Date of Patent: Mar. 12, 2024

(54) STROKE ERASE METHOD, TERMINAL, AND COMPUTER-READABLE STORAGE MEDIUM

(71) Applicant: ZTE Corporation, Shenzhen (CN)

(72) Inventor: Qian Dong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 47 days.

(21) Appl. No.: 17/629,575

(22) PCT Filed: Jul. 22, 2020

(86) PCT No.: PCT/CN2020/103549
§ 371 (c)(1),
(2) Date: Jan. 24, 2022

(87) PCT Pub. No.: WO2021/013183
PCT Pub. Date: Jan. 28, 2021

(65) Prior Publication Data
US 2022/0276754 A1 Sep. 1, 2022

(30) Foreign Application Priority Data

Jul. 25, 2019 (CN) .......................... 201910678118.2

(51) Int. Cl.
*G06F 3/0484* (2022.01)
*G06F 3/0488* (2022.01)
*G06T 11/00* (2006.01)

(52) U.S. Cl.
CPC .......... *G06F 3/0484* (2013.01); *G06F 3/0488* (2013.01); *G06T 11/001* (2013.01)

(58) Field of Classification Search
CPC .. G06F 3/0488; G06F 3/0484; G06F 3/04883; G06F 3/04845; G06F 40/171; G06T 11/001; G06T 11/203
See application file for complete search history.

(56) References Cited

U.S. PATENT DOCUMENTS

2015/0261430 A1 9/2015 Hagiwara
2017/0344847 A1* 11/2017 Bellert ............. G06V 30/18181
(Continued)

FOREIGN PATENT DOCUMENTS

CN 101477694 A 7/2009
CN 102566862 A 7/2012
(Continued)

OTHER PUBLICATIONS

International Searching Authority. International Search Report and Written Opinion for PCT Application No. PCT/CN2020/103549 and English translation, dated Oct. 28, 2020, pp. 1-9.
(Continued)

*Primary Examiner* — Muhammad N Edun
(74) *Attorney, Agent, or Firm* — Vivacqua Crane, PLLC

(57) ABSTRACT

A stroke erasing method, a terminal device, and a computer-readable storage medium are disclosed. The method may include: determining an intersecting stroke on an electronic whiteboard that intersects with an erasing region; traversing each of collection points of the intersecting stroke to determine whether a line of connection between each two adjacent ones of the collection points intersects with the erasing region; determining, in response to the line of connection intersecting with the erasing region, an approximate intersection point between the line of connection and the erasing region by means of midpoint recursion; and splitting the intersecting stroke into segments according to the approximate intersection point, and drawing the segments not erased by the erasing region.

18 Claims, 4 Drawing Sheets

(56) References Cited

U.S. PATENT DOCUMENTS

2018/0095653 A1* 4/2018 Hasek ................. G06F 3/04883
2019/0102079 A1* 4/2019 Smithrud ............ G06F 3/04883

FOREIGN PATENT DOCUMENTS

| CN | 103578553 A | 2/2014 |
| CN | 106502607 A | 3/2017 |
| CN | 109445676 A | 3/2019 |
| EP | 2325804 A2 | 5/2011 |

OTHER PUBLICATIONS

European Patent Office. Extended European Search Report for EP Application No. 20844552.8, dated Jul. 22, 2022, pp. 1-11.
The State Intellectual Property Office of People's Republic of China. First Office Action for CN Application No. 201910678118.2 and English translation, dated Dec. 26, 2023, pp. 1-14.
The State Intellectual Property Office of People's Republic of China. Search Report for CN Application No. 201910678118.2 and English translation, dated Dec. 21, 2023, pp. 1-4.

* cited by examiner

STROKE ERASE METHOD, TERMINAL, AND COMPUTER-READABLE STORAGE MEDIUM

CROSS-REFERENCE TO RELATED APPLICATION

This application is a national stage filing under 35 U.S.C. § 371 of international application number PCT/CN2020/103549, filed Jul. 22, 2020, which claims priority to Chinese patent application No. 201910678118.2 filed Jul. 25, 2019. The contents of these applications are incorporated herein by reference in their entirety.

TECHNICAL FIELD

Embodiments of the present disclosure relate to, but not limited to, electronic whiteboard software technologies, and in particular to, but not limited to, a stroke erasing method, a terminal device, and a computer-readable storage medium.

BACKGROUND

Writing and erasing are basic functions in electronic whiteboard software. For erasure of written content, that is, erasure of strokes, a remaining portion after each stroke erasure needs to be calculated and redrawn. A basic method is to calculate an intersection point of each stroke and an erasing region, split an original stroke through the intersection point, and redraw a portion that has not been erased after splitting. In this process, a traditional method is to traverse all points in each stroke to find an intersection point with the erasing region. This method provides an accurate calculation result, but requires a large amount of calculation, and is prone to stalling and no response especially when many strokes are erased at the same time, which affects user experience.

SUMMARY

According to embodiments of the present disclosure, a stroke erasing method, a terminal device, and a computer-readable storage medium are provided to deal with, at least to some extent, the problem that stroke erasure in some cases has a large amount of calculation and is prone to stalling and no response.

In view of the above, according to some embodiments of the present disclosure, a stroke erasing method is provided, the method may include: determining an intersecting stroke on an electronic whiteboard that intersects with an erasing region; traversing each of collection points of the intersecting stroke to determine whether a line of connection between each two adjacent ones of the collection points intersects with the erasing region; inserting, in response to the line of connection intersecting with the erasing region, an approximate intersection point of the line of connection with the erasing region into the collection points of the intersecting stroke; and splitting the intersecting stroke into segments according to the approximate intersection point, and drawing the segments not erased by the erasing region.

According to some embodiments of the present disclosure, a terminal device is further provided, the terminal device may include a processor, a memory, and a communication bus; where the communication bus is configured to implement connection communication between the processor and the memory; and the processor is configured to execute one or more programs stored in the memory to perform steps of the stroke erase method described above.

According to some embodiments of the present disclosure, a computer-readable storage medium storing one or more programs is further provided, where the one or more programs, when executed by one or more processors, cause the one or more processors to perform steps of the stroke erasing method described above.

Other features and corresponding beneficial effects of the present disclosure will be set forth in part in the description which follows, and it is to be understood that the beneficial effects in part will become apparent from the disclosure in the description of the present disclosure.

DETAILED DESCRIPTION

In order to make objects, technical schemes and advantages of the present disclosure clearer, the embodiments of the present disclosure are described in further detail below through specific embodiments in conjunction with the drawings. It is to be understood that specific embodiments described herein are intended only to interpret and not to limit the present disclosure.

Embodiment One

Figure 1:
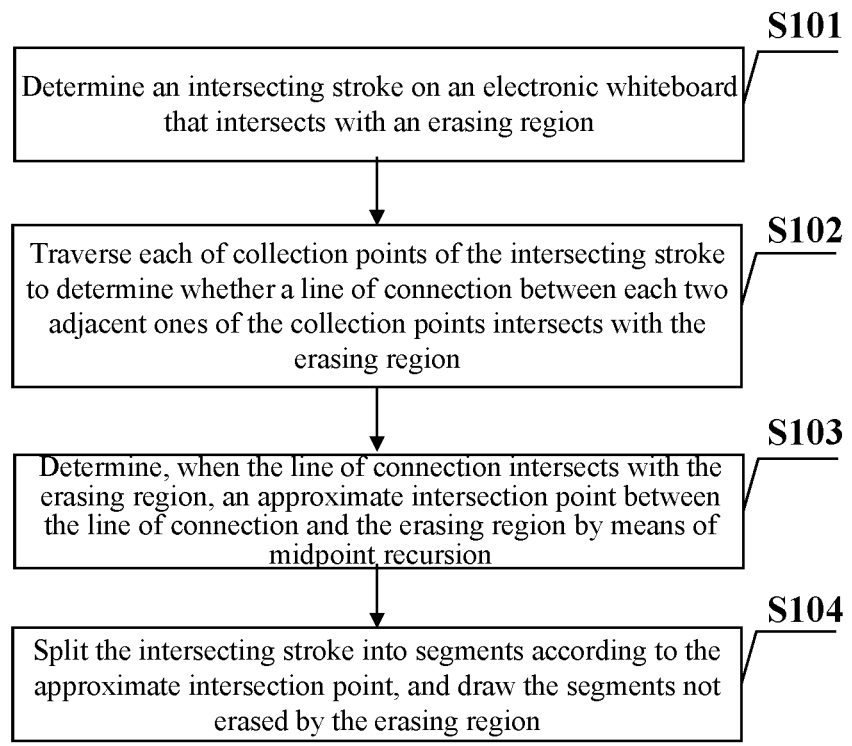
FIG. 1 is a flowchart of a stroke erasing method according to Embodiment one of the present disclosure.

In some cases, a stroke erasing method is to traverse all points in each stroke to find an intersection point with an erasing region. This method provides an accurate calculation result, but requires a large amount of calculation, and is prone to stalling and no response especially when many strokes are erased at the same time, which affects user experience. In some improved algorithms, intersection points are quickly calculated with a method of equal division and point insertion of an eraser width. This method is fast in calculation, but is not accurate enough to erase edges when the eraser width is large. In order to deal with the above problem at least to some extent, the stroke erasing method according to the embodiment of the present disclosure further optimizes a traversing process and a process of calculating intersection points, and ensures accuracy of a calculation result while reducing the amount of calculation. FIG. 1 illustrates a stroke erasing method according to an embodiment of the present disclosure, including the following steps S101 to S104.

At step S101, an intersecting stroke on an electronic whiteboard that intersects with an erasing region is determined.

In the embodiment of the present disclosure, there is a stroke on the electronic whiteboard. When an eraser is used for erasure, an erasing region of the eraser intersects with the stroke. Then, an intersecting stroke is determined by calculating intersection between the stroke and the erasing region, and non-intersecting strokes are quickly filtered out.

Figure 2:
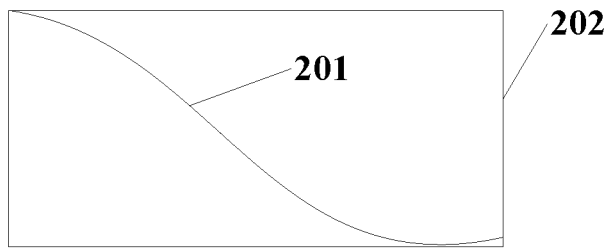
FIG. 2 is a schematic diagram of a boundary rectangle where a stroke is located according to Embodiment one of the present disclosure.
Figure 3:
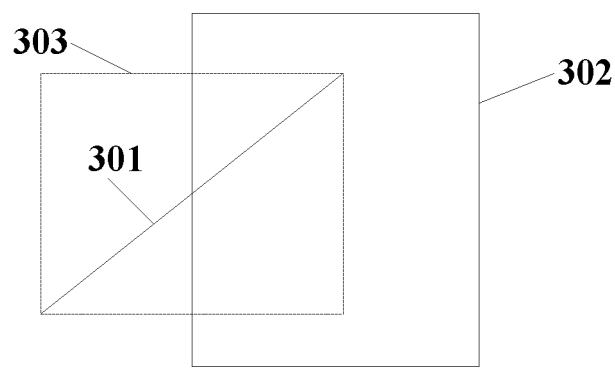
FIG. 3 is a schematic diagram of intersection between a stroke and an erasing region according to Embodiment one of the present disclosure.

Determining an intersecting stroke includes traversing each stroke on the electronic whiteboard, and calculating intersection of the erasing region with a boundary rectangle where the stroke is located, to determine the intersecting stroke. The stroke includes a bezier curve, and the erasing region includes a polygon region. In the embodiment of the present disclosure, each stroke refers to a bezier curve, and a boundary rectangle of the stroke is a minimum rectangle including the curve. As shown in FIG. 2, a stroke 201 has a boundary rectangle 202. Operation is directly performed on the minimum rectangle and the erasing region of the polygon region to determine whether an overlapping region exists between the minimum rectangle and the polygon region. When there is an overlapping region, a stroke corresponding to the minimum rectangle is determined to be an intersecting stroke. As shown in FIG. 3, assuming that there is a stroke 301 and a quadrilateral erasing region 302, and an overlapping region exists between a boundary rectangle 303 corresponding to the stroke 301 and the quadrilateral erasing region 302, the stroke 301 is determined to be an intersecting stroke.

At step S102, each of collection points of the intersecting stroke is traversed to determine whether a line of connection between each two adjacent ones of the collection points intersects with the erasing region.

It may be understood that, in the electronic whiteboard, each stroke is generated by drawing a bezier curve from points collected by a system, so that the intersecting stroke includes collection points. All the collection points are traversed. For each two adjacent collection points, a line of connection between the two collection points approximately represents a curve segment where the two points are located. Therefore, the line of connection between two points of the intersecting stroke is further filtered to determine whether a line of connection between each two adjacent ones of the collection points intersects with the erasing region, which includes:

determining the line of connection between the two collection points to be intersected with the erasing region when at least one of the two collection points is within the erasing region, that is, when either one of the collection points is within the erasing region or the two collection points are within the erasing region.

Figure 4:
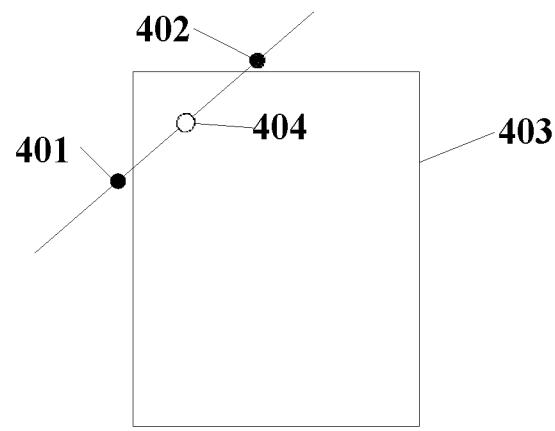
FIG. 4 is a schematic diagram of intersection between a line of connection of two adjacent collection points and the erasing region according to Embodiment one of the present disclosure.

When the two collection points are not within the erasing region and a length of the line of connection is determined to be less than a width w of the erasing region, a midpoint of the two collection points is calculated and it is determined whether the midpoint is within the erasing region; and the line of connection is determined to be intersected with the erasing region when the midpoint is within the erasing region. The width of the erasing region is a length of intersection between a horizontal line where a central point of the polygon region is located and the polygon region. For example, when the erasing region is an oblong, a width of the oblong is the width of the erasing region. As shown in FIG. 4, two adjacent collection points 401 and 402 of an intersecting stroke are not within an erasing region 403 and a distance between the collection points 401 and 402 is less than a width of the erasing region 403. A midpoint 404 of the collection points 401 and 402 in FIG. 4 is within the erasing region 403, so it is considered that a line of connection between the collection points 401 and 402 intersects with the erasing region 403. When the midpoint 404 is not within the erasing region 403, it is considered that the line of connection between the two points does not intersect with the erasing region 403 and is filtered out.

Figure 5:
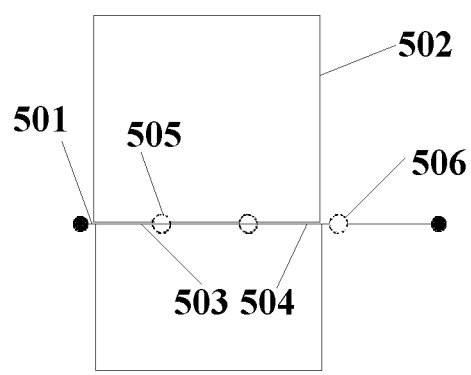
FIG. 5 is a first schematic diagram of intersection between line segments of the line of connection of two adjacent collection points and the erasing region according to Embodiment one of the present disclosure.

In the embodiment of the present disclosure, when both the two collection points are not within the erasing region and the length of the line of connection is greater than or equal to the width of the erasing region, the line of connection is split into two first line segments based on the middle of the line of connection. When a length of each of the first segments is determined to be less than the width of the erasing region, it is determined whether a midpoint of the first line segment is within the erasing region. When the midpoint of the first line segment is within the erasing region, it is determined that the first line segment intersects with the erasing region. That is, when the length of the line of connection between two collection points is greater than or equal to the width w of the eraser, a midpoint of the two collection points is calculated. The two original collection points are split by the midpoint to obtain two first line segments with an equal length, which are a line segment from a first collection point to the midpoint and a line segment from the midpoint to a second collection point, respectively. It is determined whether each of the first line segments intersects with the erasing region. As shown in FIG. 5, a length of a line of connection 501 between two collection points is greater than a width of an erasing region 502, and the line of connection 501 is split into two first line segments 503 and 504 from a midpoint. Assuming that the length of each of the first line segments 503 and 504 is less than the width of the erasing region 502, and a midpoint 505 of the first line segment 503 is within the erasing region 502, it is considered that the first line segment 503 intersects with the erasing region. A midpoint 506 of the first line segment 504 is not within the erasing region 502, and then the first line segment 504 of the two collection points can be filtered out.

Figure 6:
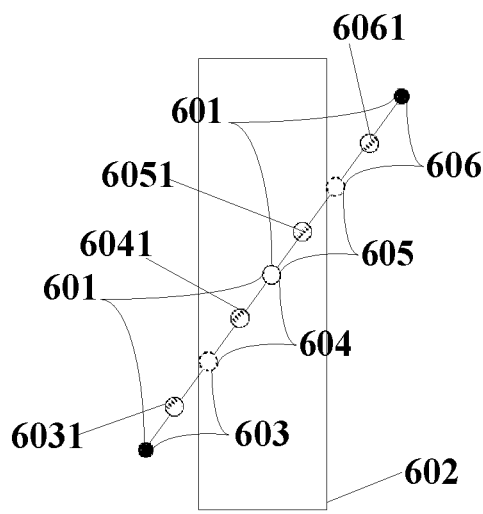
FIG. 6 is a second schematic diagram of intersection between line segments of the line of connection of two adjacent collection points and the erasing region according to Embodiment one of the present disclosure.

It is to be noted that, when the length of the first line segment is determined to be greater than or equal to the width of the erasing region, calculation of intersection is continued by means of midpoint recursion. In some embodiments, when the length of the first line segment is determined to be greater than or equal to the width of the erasing region, the first line segment is split based on the midpoint of the first line segment until a length of a second line segment after splitting is less than the width of the erasing region. The second line segment intersects with the erasing region when a midpoint of the second line segment is within the erasing region. That is, when the length of the first line segment is greater than or equal to the width w of the eraser, splitting is continued based on midpoint until the length is less than the width w of the eraser, in which case it is also determined with the midpoint whether a line of connection between two points intersects with the erasing region. For example, as shown in FIG. 6, a line of connection between two collection points includes two first line segments 601, each with a length greater than a width of an erasing region 602. The two first line segments 601 are split respectively from a midpoint of two points to obtain four second line segments 603-606, and the lengths of each of the second line segments 603-606 is less than the width of the erasing region 602. It is determined whether respective midpoints 6031-6061 of the second line segments 603-606 are within the erasing region 602. In FIG. 6, the midpoints 6041 and 6051 are within the erasing region 602, so it is determined that the second line segments 604 and 605 intersect with the erasing region 602, while the midpoints 6031 and 6061 are not within the erasing region 602, so the second line segments 603 and 606 can be filtered out.

At step S103, an approximate intersection point between the line of connection and the erasing region is determined by means of midpoint recursion when the line of connection intersects with the erasing region.

Figure 7:
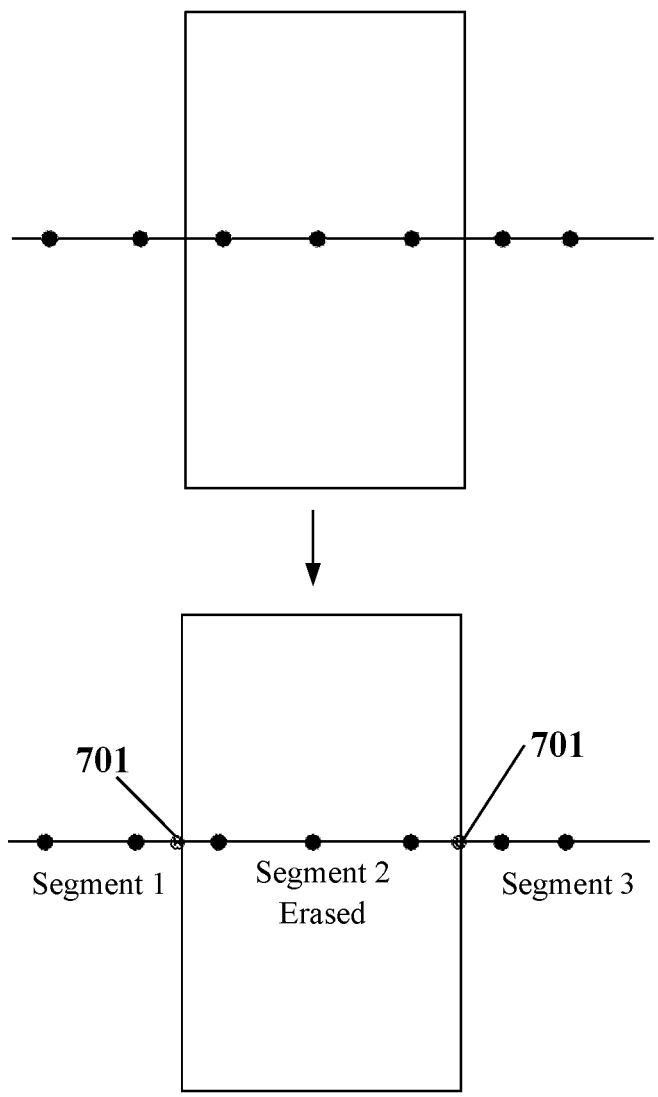
FIG. 7 is a schematic diagram of splitting of a stroke point set into segments according to Embodiment one of the present disclosure.

It may be understood that determining that the line of connection intersects with the erasing region includes: when the line of connection where two adjacent collection points are located includes multiple line segments, determining that the line segments intersect with the erasing region. The line segments include the first line segments or second line segments described above. Approximate intersection points between the line of connection or the line segments of the line of connection and the erasing region are inserted into the collection points of the intersecting stroke. Therefore, the approximate intersection points between the line of connection or the line segments of the line of connection and the erasing region need to be determined. In some embodiments, if one of two points corresponding to the line of connection or a line segment of the line of connection, is within the erasing region, and the other point is outside the erasing region, and a length of the line of connection or the line segment of the line of connection is determined to be less than or equal to m, a midpoint of the line of connection or the line segment of the line of connection is taken as the approximate intersection point, m being less than the width of the erasing region. That is, when one of two adjacent collection points corresponding to the line of connection is within the erasing region and the other is outside the erasing region; or when the collection point and the midpoint corresponding to the first line segment are located inside and outside the erasing region, respectively; or when two midpoints corresponding to the second line segment are located inside and outside the erasing region, respectively, and a length of the line of connection or the first line segment or the second line segment is less than or equal to m, the middle of the line of connection, the midpoint of the first line segment, or the midpoint of the second line segment is taken as an approximate intersection point. After the approximate intersection point is determined, the approximate intersection point is inserted into the collection points of the intersecting stroke. The value of m may be adjusted according to a line width of a stroke. In some examples, m=5, in which case the approximate intersection point is more accurate and the calculation is faster. As shown in FIG. 7, assuming that a length of a line of connection 701 between two collection points is less than m, a midpoint 702 of the line of connection 701 is obtained, the midpoint 702 is taken as an approximate intersection point, and the approximate intersection point 702 is inserted between the two collection points.

At step S104, the intersecting stroke is split into segments according to the approximate intersection point, and the segments not erased by the erasing region are drawn.

A stroke point set of the intersecting stroke is split into multiple segments at the approximate intersection point, and a point set of each segment is stored. At the same time, it is marked whether each segment is erased, and the segments not erased are drawn. As shown in FIG. 7, the intersecting stroke is split into Segment 1, Segment 2, and Segment 3 according to the approximate intersection point 701, and Segment 1 and Segment 3 are redrawn.

In the stroke erasing method according to the embodiment of the present disclosure, an intersecting stroke on an electronic whiteboard that intersects with an erasing region is determined; collection points of the intersecting stroke are traversed to determine whether a line of connection between each two adjacent ones of the collection points intersects with the erasing region; when the line of connection intersects with the erasing region, an approximate intersection point of the line of connection and the erasing region is determined by means of midpoint recursion; and the intersecting stroke is split into segments according to the approximate intersection point, and the segments not erased by the erasing region are drawn. Compared with the stroke erasing method in the existing technology, direct operation on a rectangle formed by line segments and the erasing region brings more accurate results. Quick intersection determination of adjacent points brings higher and more accurate calculation efficiency. The calculation of the intersection points by means of midpoint recursion provides higher and more accurate calculation efficiency.

Embodiment Two

Figure 8:
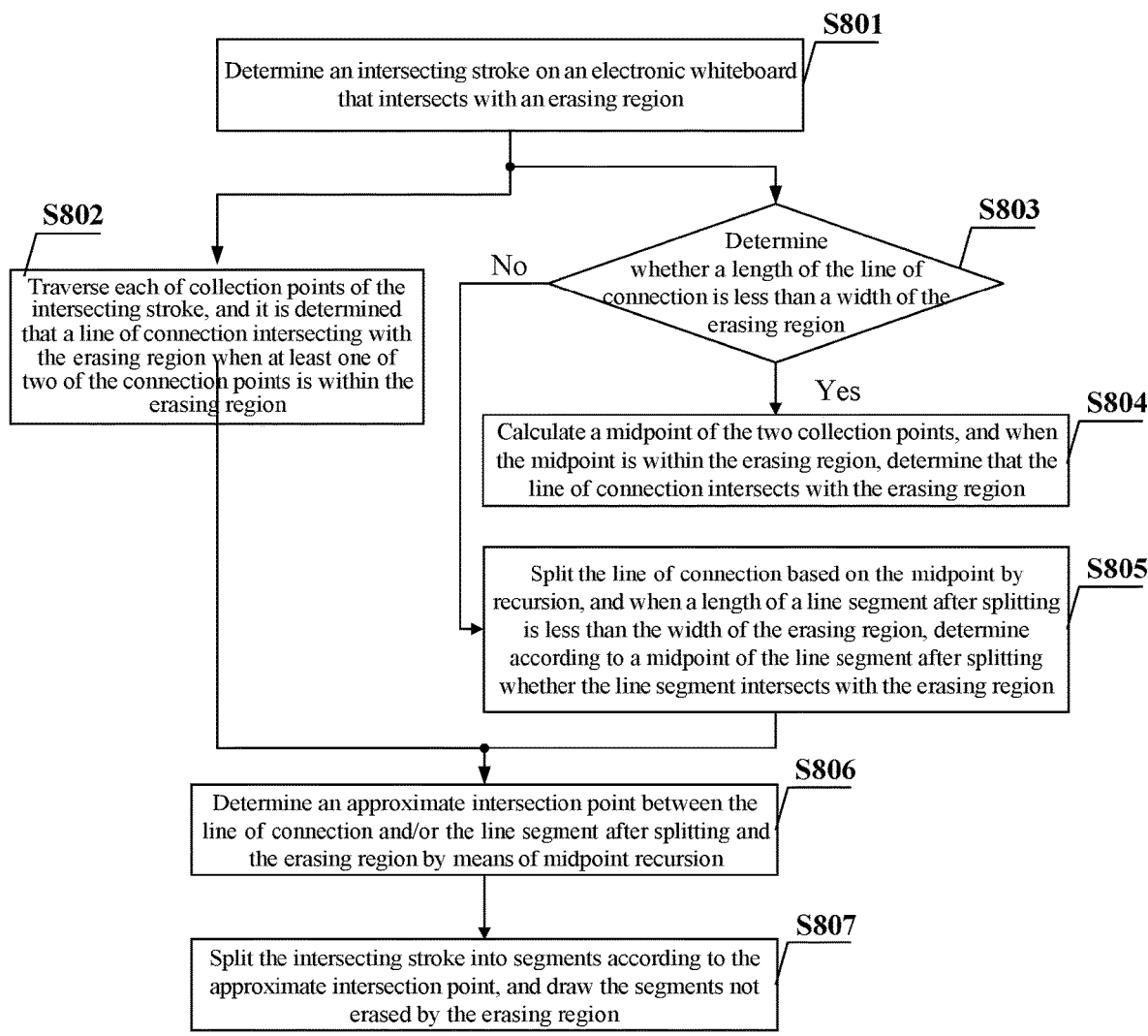
FIG. 8 is a flowchart of a stroke erasing method according to Embodiment two of the present disclosure.

For ease of understanding, a stroke erasing method is illustrated with a more specific example in this embodiment. As shown in FIG. 8, the stroke erasing method includes the following steps S801 to S807.

At step S801, an intersecting stroke on an electronic whiteboard that intersects with an erasing region is determined.

In the embodiment of the present disclosure, each stroke already existing on the whiteboard is traversed. A boundary rectangle where the stroke is located is calculated. Intersection between the rectangle and the erasing region is calculated, and non-intersecting strokes are quickly filtered out. In this way, an intersecting stroke is determined. Each stroke generally refers to a bezier curve, and the erasing region is a rectangular region.

At step S802, each of collection points of the intersecting stroke is traversed, and it is determined that a line of connection intersects with the erasing region when at least one of two of the connection points is within the erasing region.

Each stroke is generated by drawing a bezier curve from points collected by a system, so that the intersecting stroke includes multiple collection points. For each two adjacent collection points, a line of connection between the two collection points approximately represents a curve segment where the two points are located. If either one of the two collection points is within the erasing region, it is considered that the line of connection between the two collection points intersects with the erasing region.

At step S803, when the two collection points are not within the erasing region, it is determined whether a length of the line of connection is less than a width of the erasing region, if yes, S804 is performed, and if no, S805 is performed.

At step S804, a midpoint of the two collection points is calculated, and when the midpoint is within the erasing region, it is determined that the line of connection intersects with the erasing region.

When a distance between the two collection points is less than a width w of an erasing region of an eraser, a midpoint of the two collection points is calculated. When the midpoint is within the erasing region, it is considered that the line of connection between the two collection points intersects with the erasing region, and does not intersect otherwise.

At step S805, the line of connection is split based on the midpoint by recursion, and when a length of a line segment after splitting is less than the width of the erasing region, it is determined according to a midpoint of the line segment after splitting whether the line segment intersects with the erasing region.

When a distance between two points is greater than or equal to the width w of the erasing region of the eraser, a midpoint of the two points is calculated. The two original points are split at the midpoint, and it is determined whether a first line segment 1 (from a first point to the midpoint) and a first line segment 2 (from the midpoint to a second point) intersect with the erasing region, respectively. The first line segment 1 has the same length as the first line segment 2. When the length of the first line segment 1 is greater than or equal to the width w of the erasing region of the eraser, splitting is continued with a midpoint of two points, and recursive calculation is performed, until a length of each line segment after splitting is less than the width w of the erasing region of the eraser, in which case it is determined, by calculating whether a midpoint of two points is within the erasing region, whether the first line segment intersects with the erasing region. When the length of the first line segment 1 is less than the width w of the erasing region of the eraser, it is respectively determined whether the midpoint of the first line segment 1 and the midpoint of the first line segment 2 are within the erasing region. If yes, it indicates that the first line segment 1 or the first line segment 2 intersects with the erasing region. When the midpoint is not within the erasing region, the first line segment whose midpoint is not within the erasing region is filtered out.

At step S806, an approximate intersection point of the line of connection or the line segment after splitting and the erasing region is determined by means of midpoint recursion.

In the embodiment of the present disclosure, approximate intersection points between a line of connection of two adjacent collection points or the line segment split from the line of connection meeting a preset condition and the erasing region are determined. The preset condition includes, of the two points of the line of connection or a first line segment after splitting, one being within the erasing region and the other being outside the erasing region, and a length of the line of connection or the line segment being less than or equal to a preset value. The preset value may be adjusted according to a line width of a stroke, such as 5. It is to be noted that the width of the erasing region is greater than 5 in this embodiment.

When the length of the line of connection or the line segments after splitting is less than or equal to 5, a midpoint of the line of connection or the line segments is taken as the approximate intersection point. When the length of the line of connection or the line segment is greater than 5, a midpoint of two points is calculated, and the two points are split into two segments at the midpoint. If a first segment (from a first point to the midpoint) has one point within the erasing region and the other point outside the erasing region, the two points of the first segment are split continuously at the midpoint of the two points, and recursive calculation is performed, until a distance between the two points is less than or equal to 5, in which case the midpoint of the two points is taken as an approximate intersection point. If a second segment (from the midpoint to a second point) has one point within the erasing region and the other point outside the erasing region, an approximate intersection point is obtained by the same calculation.

At step S807, the intersecting stroke is split into segments according to the approximate intersection point, and the segments not erased by the erasing region are drawn.

The intersection points obtained by calculation are additionally inserted into an original point set of the stroke, and the point set of the stroke is split at an intersection point and stored in segments. Each segment is a segment. At the same time, it is marked whether each segment is erased, and segments not erased are drawn.

In the stroke erasing method according to the embodiment of the present disclosure, intersection between each stroke and an erasing region is calculated, and all collection points of the stroke are traversed. For each two adjacent collection points, it is calculated whether the segment of the two adjacent collection points intersects with the erasing region, and for two points whose segment intersecting with the erasing region, an approximate intersection point between the segment and the erasing region is calculated and is inserted into an original point set. The point set of the stroke is split at the intersection point and stored in segments, and at the same time, it is marked whether each segment is erased and segments not erased are drawn. In this way, the stroke and the point set forming the stroke can be rapidly filtered multiple times, which greatly reduces the amount of calculation of stroke erasure, and at the same time, the accuracy of calculation can be adjusted according to a line width of the stroke, bringing a more accurate erasing result, improving operation efficiency of stroke erasure, and improving user experience of stroke erasure in the electronic whiteboard on the whole.

Embodiment Three

Figure 9:
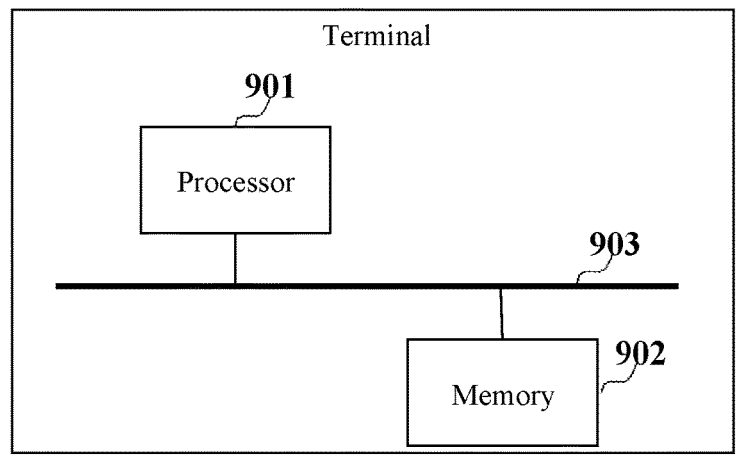
FIG. 9 is a schematic structural diagram of a terminal device according to Embodiment three of the present disclosure.

The embodiment of the present disclosure provides a terminal device, as shown in FIG. 9, including a processor 901, a memory 902 and a communication bus 903.

The communication bus 903 is configured to implement connection communication between the processor 901 and the memory 902.

The processor 901 is configured to execute one or more programs stored in the memory 902, so as to perform the following steps:

determining an intersecting stroke on an electronic whiteboard that intersects with an erasing region;

traversing each of collection points of the intersecting stroke to determine whether a line of connection between each two adjacent ones of the collection points intersects with the erasing region;

determining, when the line of connection intersects with the erasing region, an approximate intersection point between the line of connection and the erasing region by means of midpoint recursion; and splitting the intersecting stroke into segments according to the approximate intersection point, and drawing the segments not erased by the erasing region.

In the embodiment of the present disclosure, the determining an intersecting stroke on an electronic whiteboard that intersects with an erasing region by the processor 901 includes: traversing each stroke on the electronic whiteboard, and calculating intersection between the erasing region and a boundary rectangle where the stroke is located, to determine the intersecting stroke, the stroke including a bezier curve, the erasing region including a polygon region.

It is to be noted that the determining whether a line of connection between each two adjacent ones of the collection points intersects with the erasing region by the processor 901 includes: determining that the line of connection intersecting with the erasing region when at least one of the two collection points is within the erasing region. When the two collection points are not within the erasing region and a length of the line of connection is determined to be less than a width of the erasing region, a midpoint of the two collection points is calculated and it is determined whether the midpoint is within the erasing region; and it is determined that the line of connection intersects with the erasing region when the midpoint is within the erasing region. On this basis, the line of connection is split into two first line segments based on the middle of the line of connection when the length of the line of connection is greater than or equal to the width of the erasing region; when a length of each of the first line segments is determined to be less than the width of the erasing region, it is determined whether a midpoint of the first line segment is within the erasing region; and it is determined that the first line segment intersects with the erasing region when the midpoint of the first line segment is within the erasing region. When the length of the first line segment is determined to be greater than or equal to the width of the erasing region, the first line segment is split based on the midpoint of the first line segment until a length of a second line segment after splitting is less than the width of the erasing region; and it is determined that the second line segment intersects with the erasing region when a midpoint of the second line segment is within the erasing region.

For the line segment or the line of connection intersecting with the erasing region, if, of the two points corresponding to the line of connection or the line segment of the line of connection, one point is within the erasing region, and the other point is outside the erasing region, the processor 901 further configured to: when it is determined that a length of the line of connection or the line segment of the line of connection is less than or equal to m, take a midpoint of the line of connection or the line segments of the line of connection as the approximate intersection point, m being less than the width of the erasing region; and when it is determined that the length of the line of connection or the line segment of the line of connection is greater than m, perform splitting according to the midpoint of the line of connection or the line segment of the line of connection until a length of a sub-segment after splitting is less than or equal to m, and take a midpoint of the sub-segment as the approximate intersection point.

According to some embodiments of the present disclosure, a computer-readable storage medium storing one or more programs is further provided, where the one or more programs, when executed by one or more processors, cause the one or more processors to perform steps of the stroke erasing method in the above embodiment.

The computer-readable storage medium includes volatile and nonvolatile, removable and non-removable media implemented in any method or technology for storing information (such as computer-readable instructions, data structures, computer program modules or other data). The computer-readable storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage apparatuses, or any other medium used for storing desired information and accessible to a computer.

The embodiments of the present disclosure have the following beneficial effects.

In the stroke erasing method, the terminal device, and the computer-readable storage medium according to the embodiments of the present disclosure, an intersecting stroke on an electronic whiteboard that intersects with an erasing region is determined. Each of collection points of the intersecting stroke is traversed to determine whether a line of connection between each two adjacent ones of the collection points intersects with the erasing region. When the line of connection intersects with the erasing region, an approximate intersection point between the line of connection and the erasing region is determined by means of midpoint recursion. The intersecting stroke is split into segments according to the approximate intersection point, and the segments not erased by the erasing region are drawn. In the embodiments of the present disclosure, the intersecting stroke is determined directly by the strokes on the electronic whiteboard and the erased region, bringing an accurate result, and quick intersection determination of adjacent points and the calculation of the approximate intersection points by means of midpoint recursion bring higher and more accurate calculation efficiency.

Apparently, those having ordinary in the art should understand that all or some of the steps of the method, functional modules/units in the system and the apparatus disclosed above may be implemented as software (which may be implemented using program code executable by a computing device), firmware, hardware and appropriate combinations thereof. In the hardware implementation, the division of the functional modules/units mentioned in the above description may not correspond to the division of physical components. For example, one physical component may have multiple functions, or one function or step may be executed jointly by several physical components. Some or all physical components may be implemented as software executed by processors such as digital signal processors or microcontrollers, implemented as hardware, or implemented as integrated circuits such as application specific integrated circuits.

In addition, as is well known to those having ordinary skill in the art, the communication medium generally includes computer-readable instructions, data structures, program modules or other data in modulated data signals such as carriers or other transmission mechanisms, and may include any information delivery medium. Therefore, the present disclosure is not limited to any specific combination of hardware and software.

The above are further detailed descriptions of the present disclosure in conjunction with specific embodiments, and it should be noted that the specific embodiments of the present disclosure are not limited to such descriptions. For those having ordinary skill in the art, several simple deductions or replacements may further be made without departing from the concept of the present disclosure, all of which should be considered within the protection scope of the present disclosure.

The invention claimed is:

1. A stroke erasing method implemented in an electronic whiteboard, comprising:
   determining an intersecting stroke on the electronic whiteboard that intersects with an erasing region;
   traversing each of collection points of the intersecting stroke to determine whether a line of connection between each two adjacent ones of the collection points intersects with the erasing region;
   determining, in response to the line of connection intersecting with the erasing region, an approximate intersection point between the line of connection and the erasing region by means of midpoint recursion; and
   splitting the intersecting stroke into segments according to the approximate intersection point, and drawing the segments not erased by the erasing region on the electronic whiteboard,
   wherein the determining an approximate intersection point between the line of connection and the erasing region by means of midpoint recursion comprises:
      in response to, of two points corresponding to the line of connection or a line segment of the line of connection, one point being within the erasing region, and the other point being outside the erasing region,
      taking a midpoint of the line of connection or the line segment of the line of connection as the approximate intersection point in response to determining a length of the line of connection or the line segment of the line of connection to be less than or equal to m, m being less than the width of the erasing region.

2. The stroke erasing method of claim 1, wherein determining an intersecting stroke on the electronic whiteboard that intersects with an erasing region comprises:
   traversing each stroke on the electronic whiteboard, and calculating intersection between the erasing region and a boundary rectangle where the stroke is located, to determine the intersecting stroke, the stroke comprising a bezier curve, and the erasing region comprising a polygon region.

3. The stroke erasing method of claim 2, wherein the determining whether a line of connection between each two adjacent ones of the collection points intersects with the erasing region further comprises:
   determining that the line of connection intersects with the erasing region in response to at least one of the two collection points being within the erasing region.

4. The stroke erasing method of claim 3, wherein the determining whether a line of connection between each two adjacent ones of the collection points intersects with the erasing region further comprises:
   in response to the two collection points being not within the erasing region and a length of the line of connection being determined to be less than a width of the erasing region,
   calculating a midpoint of the two collection points and determining whether the midpoint is within the erasing region; and
   determining that the line of connection intersects with the erasing region in response to the midpoint being within the erasing region.

5. The stroke erasing method of claim 4, wherein the determining whether a line of connection between each two adjacent ones of the collection points intersects with the erasing region further comprises:
   splitting the line of connection into two first line segments based on the middle of the line of connection in response to the length of the line of connection being greater than or equal to the width of the erasing region;
   determining, in response to a length of each of the first line segments being determined to be less than the width of the erasing region, whether a midpoint of the first line segment is within the erasing region; and
   determining that the first line segment intersects with the erasing region in response to the midpoint of the first line segment being within the erasing region.

6. The stroke erasing method of claim 5, wherein the determining whether a line of connection between each two adjacent ones of the collection points intersects with the erasing region further comprises:
   in response to the length of the first line segments being determined to be greater than or equal to the width of the erasing region, splitting the first line segment based on the midpoint of the first line segment until a length of a second line segment after splitting is less than the width of the erasing region; and
   determining that the second line segment intersects with the erasing region in response to a midpoint of the second line segment being within the erasing region.

7. The stroke erasing method of claim 1, wherein the determining an approximate intersection point between the line of connection and the erasing region by means of midpoint recursion further comprises:
   in response to determining the length of the line of connection or the line segment of the line of connection to be greater than m, performing splitting according to the midpoint of the line of connection or the line segment of the line of connection until a length of a sub-line segment after splitting is less than or equal to m, and taking a midpoint of the sub-line segment as the approximate intersection point.

8. A terminal device, comprising a processor, a memory, and a communication bus; wherein
   the communication bus is configured to implement connection communication between the processor and the memory; and
   the processor is configured to execute one or more programs stored in the memory to perform steps of a stroke erasing method implemented in an electronic whiteboard, wherein the method comprises:
      determining an intersecting stroke on the electronic whiteboard that intersects with an erasing region;
      traversing each of collection points of the intersecting stroke to determine whether a line of connection between each two adjacent ones of the collection points intersects with the erasing region;
      determining, in response to the line of connection intersecting with the erasing region, an approximate intersection point between the line of connection and the erasing region by means of midpoint recursion; and
      splitting the intersecting stroke into segments according to the approximate intersection point, and drawing the segments not erased by the erasing region on the electronic whiteboard;
      wherein the determining an approximate intersection point between the line of connection and the erasing region by means of midpoint recursion comprises:
         in response to, of two points corresponding to the line of connection or a line segment of the line of connection, one point being within the erasing region, and the other point being outside the erasing region, taking a midpoint of the line of connection or the line segment of the line of connection as the approximate intersection point in response to determining a length of the line of connection or the line segment of the line of connection to be less than or equal to m, m being less than the width of the erasing region.

9. The terminal device of claim 8, wherein determining an intersecting stroke on the electronic whiteboard that intersects with an erasing region comprises:

traversing each stroke on the electronic whiteboard, and calculating intersection between the erasing region and a boundary rectangle where the stroke is located, to determine the intersecting stroke, the stroke comprising a bezier curve, and the erasing region comprising a polygon region.

10. The terminal device of claim 9, wherein the determining whether a line of connection between each two adjacent ones of the collection points intersects with the erasing region further comprises:

determining that the line of connection intersects with the erasing region in response to at least one of the two collection points being within the erasing region.

11. The terminal device of claim 10, wherein the determining whether a line of connection between each two adjacent ones of the collection points intersects with the erasing region further comprises:

in response to the two collection points being not within the erasing region and a length of the line of connection being determined to be less than a width of the erasing region, calculating a midpoint of the two collection points and determining whether the midpoint is within the erasing region; and determining that the line of connection intersects with the erasing region in response to the midpoint being within the erasing region.

12. The terminal device of claim 11, wherein the determining whether a line of connection between each two adjacent ones of the collection points intersects with the erasing region further comprises:

splitting the line of connection into two first line segments based on the middle of the line of connection in response to the length of the line of connection being greater than or equal to the width of the erasing region;

determining, in response to a length of each of the first line segments being determined to be less than the width of the erasing region, whether a midpoint of the first line segment is within the erasing region; and determining that the first line segment intersects with the erasing region in response to the midpoint of the first line segment being within the erasing region.

13. The terminal device of claim 12, wherein the determining whether a line of connection between each two adjacent ones of the collection points intersects with the erasing region further comprises:

in response to the length of the first line segments being determined to be greater than or equal to the width of the erasing region, splitting the first line segment based on the midpoint of the first line segment until a length of a second line segment after splitting is less than the width of the erasing region; and determining that the second line segment intersects with the erasing region in response to a midpoint of the second line segment being within the erasing region.

14. The terminal device of claim 8, wherein the determining an approximate intersection point between the line of connection and the erasing region by means of midpoint recursion further comprises:

in response to determining the length of the line of connection or the line segment of the line of connection to be greater than m, performing splitting according to the midpoint of the line of connection or the line segment of the line of connection until a length of a sub-line segment after splitting is less than or equal to m, and taking a midpoint of the sub-line segment as the approximate intersection point.

15. A non-transitory computer-readable storage medium, storing one or more programs, wherein the one or more programs, when executed by one or more processors, cause the one or more processors to perform steps of a stroke erasing method implemented in an electronic whiteboard, wherein the method comprises:

determining an intersecting stroke on the electronic whiteboard that intersects with an erasing region;

traversing each of collection points of the intersecting stroke to determine whether a line of connection between each two adjacent ones of the collection points intersects with the erasing region;

determining, in response to the line of connection intersecting with the erasing region, an approximate intersection point between the line of connection and the erasing region by means of midpoint recursion; and splitting the intersecting stroke into segments according to the approximate intersection point, and drawing the segments not erased by the erasing region on the electronic whiteboard;

wherein the determining an approximate intersection point between the line of connection and the erasing region by means of midpoint recursion comprises:

in response to, of two points corresponding to the line of connection or a line segment of the line of connection, one point being within the erasing region, and the other point being outside the erasing region, taking a midpoint of the line of connection or the line segment of the line of connection as the approximate intersection point in response to determining a length of the line of connection or the line segment of the line of connection to be less than or equal to m, m being less than the width of the erasing region.

16. The non-transitory computer-readable storage medium of claim 15, wherein determining an intersecting stroke on the electronic whiteboard that intersects with an erasing region comprises:

traversing each stroke on the electronic whiteboard, and calculating intersection between the erasing region and a boundary rectangle where the stroke is located, to determine the intersecting stroke, the stroke comprising a bezier curve, and the erasing region comprising a polygon region.

17. The non-transitory computer-readable storage medium of claim 16, wherein the determining whether a line of connection between each two adjacent ones of the collection points intersects with the erasing region further comprises:

determining that the line of connection intersects with the erasing region in response to at least one of the two collection points being within the erasing region.

18. The non-transitory computer-readable storage medium of claim 17, wherein the determining whether a line of connection between each two adjacent ones of the collection points intersects with the erasing region further comprises:

in response to the two collection points being not within the erasing region and a length of the line of connection being determined to be less than a width of the erasing region, calculating a midpoint of the two collection points and determining whether the midpoint is within the erasing region; and determining that the line of connection intersects with the erasing region in response to the midpoint being within the erasing region.

\* \* \* \* \*